US008220770B2

(12) United States Patent  (10) Patent No.: US 8,220,770 B2
Justis  (45) Date of Patent: Jul. 17, 2012

(54) DOMESTIC APPLIANCE WITH HEIGHT ADJUSTABLE FOOT

(75) Inventor: Michael Justis, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 217 days.

(21) Appl. No.: 12/644,124

(22) Filed: Dec. 22, 2009

(65) Prior Publication Data

US 2011/0148259 A1   Jun. 23, 2011

(51) Int. Cl.
 *F16M 1/00* (2006.01)
(52) U.S. Cl. .................. 248/677; 248/188.8; 248/615
(58) Field of Classification Search ............ 248/677, 248/615, 616, 188.8
See application file for complete search history.

(56) References Cited

U.S. PATENT DOCUMENTS

| | | | | |
|---|---|---|---|---|
| 14,964 A * | 5/1856 | Anderson | ................ | 473/49 |
| 4,923,158 A * | 5/1990 | Saisho | ................ | 248/188.8 |
| 5,697,586 A * | 12/1997 | Lybarger | ................ | 248/188.4 |
| 6,910,666 B2 * | 6/2005 | Burr | ................ | 248/188.4 |
| 7,314,206 B2 | 1/2008 | Lee et al. | | |
| 7,325,412 B2 | 2/2008 | Yun et al. | | |
| 7,427,052 B2 * | 9/2008 | Cha et al. | ................ | 248/188.8 |
| 7,556,227 B2 | 7/2009 | Thuelig | | |
| 7,744,050 B2 * | 6/2010 | de Toledo et al. | ................ | 248/188.3 |
| 2007/0023591 A1 | 2/2007 | Kwon et al. | | |
| 2007/0240744 A1 | 10/2007 | Schlief et al. | | |
| 2007/0262213 A1 | 11/2007 | de Toledo et al. | | |
| 2008/0127456 A1 | 6/2008 | Maunsell et al. | | |
| 2008/0251685 A1 | 10/2008 | Tschinkel | | |
| 2009/0057527 A1 | 3/2009 | Jo | | |

FOREIGN PATENT DOCUMENTS

DE    102007057512 A1 * 6/2009
WO   WO 2009068398 A1 * 6/2009

* cited by examiner

*Primary Examiner* — Anita M King
(74) *Attorney, Agent, or Firm* — James E. Howard; Andre Pallapies

(57) ABSTRACT

A domestic appliance, in particular a domestic dishwasher, having at least one height-adjustable foot. According to an embodiment the invention, the foot comprises sections with essentially different coefficients of static friction.

35 Claims, 8 Drawing Sheets

DOMESTIC APPLIANCE WITH HEIGHT ADJUSTABLE FOOT

FIELD OF THE INVENTION

The present technology relates to a domestic appliance with a height adjustable foot.

BACKGROUND OF THE INVENTION

Height-adjustable domestic appliances, for example, domestic dishwashers, washing machines or the like, are generally known. For example, FIG. 11A illustrates a domestic dishwasher 205 supported on the floor by height adjustable feet 210, e.g., up to four height adjustable feet. Each height adjustable foot 210 includes a foot plate 215 with a threaded shank 220 adapted to be screwed into the appliance base. The foot plate may have one or more recesses in its base or floor contacting surface to allow access by a suitable tool for adjustment, e.g., by a driver with a hexagonal head.

The foot is normally constructed of a thermoplastic material made by an injection molding process. Thermoplastic material is characterized in that the coefficient of static friction in relation to normal domestic floors is relatively low. The floor contact surface of the foot therefore has a correspondingly low coefficient of sliding friction so that, for example, in the case of a tiled kitchen floor, the domestic appliance, when being fitted, can be pushed into a furniture recess without having to overcome major resistance from static friction.

As shown in FIG. 11A, the domestic appliance is typically secured to an adjacent furniture surface, such as a kitchen worktop, using a bracket 230. The bracket 230 is provided in an effort to avoid a potential danger that the fitting position of the domestic appliance will be changed as a result of moments and forces acting on the domestic appliance when it is in operation, for example, as a result of the spinning process of washing machines or when loading and unloading dishwashers with the baskets pulled out and heavily loaded. In one specific instance, especially if the center of gravity is shifted or otherwise positioned to the left of the front feet, the dishwasher may tilt or pivot by an angle α when heavily loaded as shown in FIG. 11B such that the top of the door may hit the floor and/or the top, rear edge of the casing abuts the inside surface of the worktop. While the aim of the bracket 230 is to maintain proper alignment and to prevent sliding in the recess, the bracket 230 also inadvertently serves as a pivot point about which the entire appliance may pivot, i.e., it supports the dishwasher weight thus making it easier for the feet, in particular the front feet, to slide, which is undesirable.

SUMMARY OF THE INVENTION

An exemplary embodiment of the invention provides a domestic appliance, in particular a domestic dishwasher, with a foot (e.g., height adjustable), which is a simple way of ensuring that the domestic appliance remains in its fitted position.

An exemplary embodiment of the invention includes a foot with sections having different coefficients of static friction. This enables the foot to be easily adjusted by, for example, a screw thread of the foot, while in the floor area of the foot, e.g., the surface of the foot plate facing or contacting the floor, slip-proof positioning is provided.

In an exemplary embodiment of the invention, the coefficient of static friction in the section of surface in contact with the floor is greater than in the other sections of the foot. For this, the coefficient of static friction relates to normal household floor coverings.

In an exemplary embodiment of the invention, sections of the foot are made from a first material, e.g., a thermoplastic such as polypropylene (PP) and the section in the area of the surface in contact with the floor is made from a second material, e.g., thermoplastic elastomer (TPE) or an elastic TPE.

In an exemplary embodiment of the invention, the second material of the foot provides a substantially slip-proof support for the domestic appliance. On the other hand, the first material of the foot can be functionally optimized, so that it can withstand loads that are incurred when adjusting the height or supporting the domestic appliance.

Particularly in the case of smooth kitchen floors, with a low coefficient of static friction, it is advantageous if the second material of the foot increases static friction between the kitchen floor and the foot. The second material can preferably be an elastomeric material. By contrast, the first material can be used to give the foot a structured basic body, which is considerably more dimensionally stable and/or harder than the second material.

In an embodiment, the second material is provided to a selected portion or area of the floor contacting surface of the foot (i.e., the entire area provided by the floor contacting surface is not covered by the second material). This arrangement provides a tradeoff to benefit both installation and operational uses. That is, such arrangement provides sufficient static friction during use (e.g., to prevent movement or tilting of the appliance in use), but does not provide a disproportionate amount of friction to prevent sliding for installation. Also, the first material can be constructed to have a surface area that is large enough to stably support the appliance. This relatively large support area need not be entirely enhanced in a frictional sense as only a small amount of friction enhancing material can be provided to prevent sliding.

In an alternative embodiment, the second material may be provided to the area (e.g., partial or entire) of the floor contacting surface of the foot. In such arrangement, the friction provided by the foot may substantially prevent sliding or make sliding difficult for installation purposes. Accordingly, such a foot may be provided to the front feet of the domestic appliance (which may be lifted from the ground during installation), while the back feet of the domestic appliance may be substantially friction free to allow sliding.

The basic body of the foot can have a static friction element on its floor side which is formed from the second material. In order to achieve a permanent connection between the static friction element and the basic body of the foot, the static friction element may be securely anchored to and supported by the basic body. For this purpose, the static friction element may be inserted into a recess or groove in the floor side of the basic body. The recess provides a secure grip for the static friction element in the basic body, particularly when lateral forces are applied to the domestic appliance.

In addition or as an alternative to the recess, one or more openings may be provided in the basic body, particularly in its foot plate, each opening being open both to the top and the floor side of the foot plate. The static friction element can be led through the opening down from the top of the foot plate facing away from the floor contact surface. This brings about a secure connection, e.g., a mechanical interlock, in an exemplary embodiment between the foot plate and the static friction element.

As a further method of fixing, the static friction element may have one or more extended anchoring sections that project from the top of the foot plate. Each anchoring section overlaps the top of the foot plate, thereby improving a connection between the static friction element and the foot plate.

The anchoring section of the static friction element that is located at the tip of the foot plate may also be enclosed by a molded section that protrudes downwards from the foot plate. The molded section provides an additional buttress, particularly against operational tensile and pressure loads that change with high frequency, in order to hold the static friction element securely in position. The molded section can, for example, be a pedestal-type transition from the threaded shank to the foot plate.

As already mentioned above, the static friction element can be inserted in a recess or groove in the basic body. The recess may be, in the form of a circumferential groove, which extends like a frame at least partly around a tool attachment located centrally in the floor contact surface.

A relatively strong grip is achieved for the static friction element in that the opening to the top of the foot plate mentioned above is directly in the base of the recess.

For a slip-proof support for the domestic appliance, the static friction element can protrude by a preset amount from the recess or the opening of the foot plate. The protrusion may be within the approximate range of 1-7 mm. In order to achieve a secure anchor for the static friction element, the protrusion of the anchoring section located on the opposite foot plate top may be within the range of about 2 to 5 mm.

The static friction element can be positioned like a frame circumferentially, roughly annularly, or in a star-shape on the base of the basic body. A tool attachment can be provided in the floor side of the basic foot body centrally within the frame-like static friction element.

For simple fabrication, the second material, providing the floor contact surface, may be applied to the first material of the foot by a plastic injection molding process. In such fabrication process, the basic body of the foot may be formed in an initial step. In a subsequent fabrication step, the basic body is placed as a plug in an injection molding chamber of a mold and is then recast with the second material. As a result, the basic body can be connected to the static friction element formed from the second material, e.g., chemically and/or mechanically connected or locked.

Another aspect of the invention relates to a foot for supporting a domestic appliance on the floor. The foot includes a foot body constructed of a first material and a friction element constructed of a second material. The foot body includes a connecting member adapted to connect to a base of the domestic appliance and a base plate. The friction element is provided to the base plate and includes a floor contacting surface adapted to contact the floor in use. The foot body is structured to provide a support and attachment function to the foot and the friction element is structured to provide a friction function to the foot to maintain positioning of the foot with respect to the floor in use. The second material has a coefficient of static friction that is greater than that of the first material. The friction element is provided to one or more selected portions or areas of the base plate such that the friction element covers the selected portions or areas of the base plate and other portions or areas of the base plate are uncovered.

Another aspect of the invention relates to a method for forming a foot adapted to support a domestic appliance on the floor. The method includes molding a foot body of a first material in a mold and molding a friction element of a second material in the mold onto the foot body. The second material has a coefficient of static friction that is greater than that of the first material.

Another aspect of the invention relates to a domestic appliance including an appliance base and at least one foot provided to the appliance base to support the appliance in an operative position. Each foot includes a section adapted to contact the floor in use and the section is constructed of a material that increases static friction between the foot and the floor in use.

Another aspect of the invention relates to a foot for an appliance including a base portion made of a first material and having a connecting member adapted to connect to a base of the appliance and a base plate including a bottom surface to contact the floor in use, and at least one groove or recess formed in the bottom surface to receive a second material having enhanced friction compared to the first material.

Another aspect of the invention relates to a foot for an appliance including a base portion made of a first material and having a connecting member adapted to connect to a base of the appliance and a base plate including a bottom surface to contact the floor in use, and at least one groove or recess formed in the bottom surface to optionally receive a second material having enhanced friction compared to the first material, such that the foot is operable in a first mode in which the bottom surface of the first material contacts the floor in use without the second material being in the groove or recess, and a second mode in which the second material is included in the at least one groove such that it contacts the floor in use.

Another aspect of the invention relates to a dishwasher including a washing compartment, a door provided to the washing compartment, and a plurality of feet provided to a base of the washing compartment to support washing compartment on the floor. At least one of the feet includes a section adapted to contact the floor in use and the section is constructed of a material that increases static friction between the foot and the floor in use.

Another aspect of the invention relates to a dishwasher including a washing compartment, a door provided to the washing compartment, and a plurality of feet provided to a base of the washing compartment to support washing compartment on the floor. At least one of the feet includes an enhanced friction portion compared to the other feet.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The following description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

Figure 1:
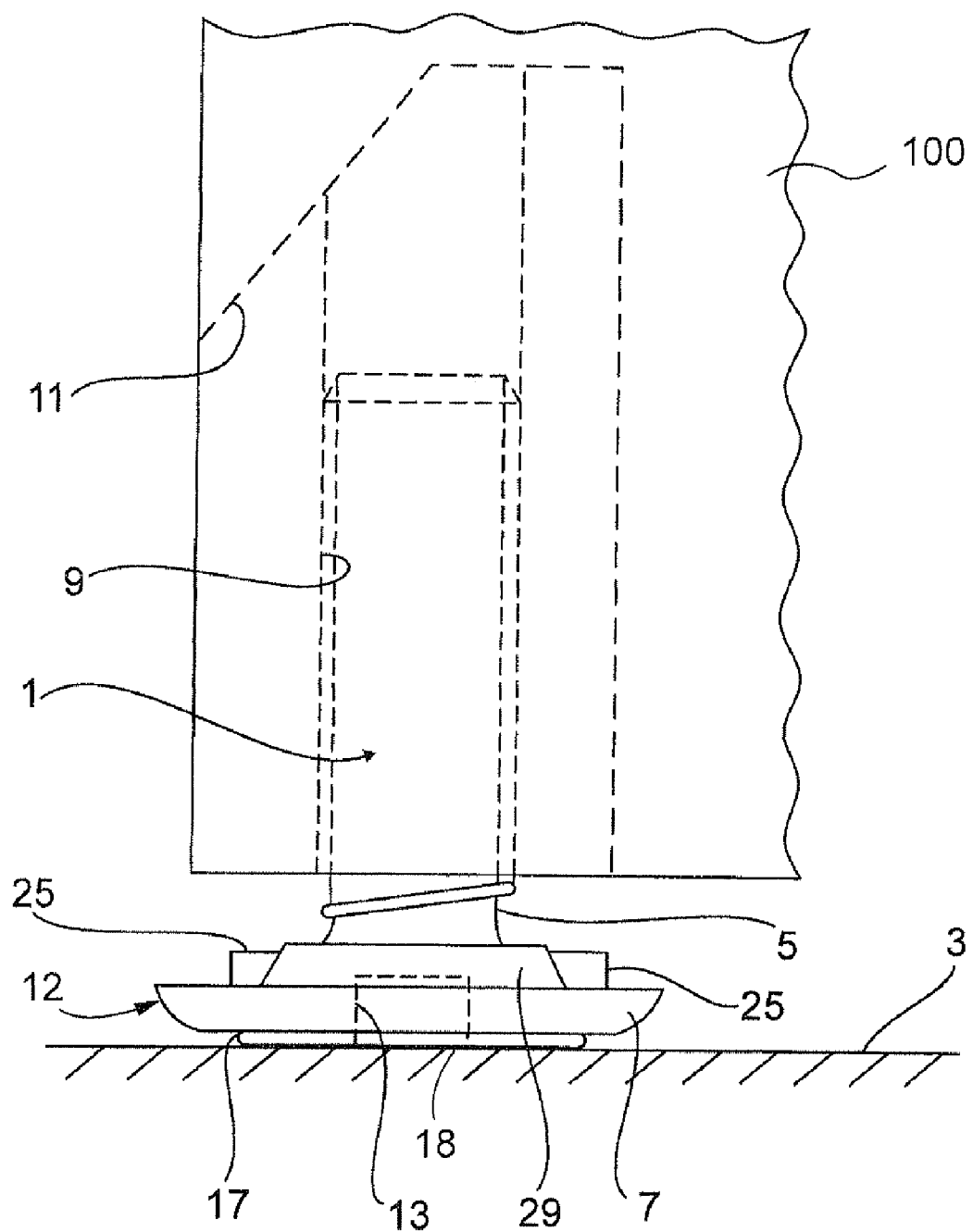
FIG. 1 shows an enlarged side view of a height adjustment device for a domestic appliance according to an embodiment of the present invention.

FIG. 1 shows a domestic appliance including a height adjustment device in accordance with an exemplary embodiment of the present technology. In particular, FIG. 1 shows a bottom front corner of a domestic appliance, e.g., domestic dishwasher, with a height adjustment device according to an embodiment of the invention. The height adjustment device allows the height of the domestic appliance to be adjusted in its built-in position, in order, for example, to compensate for unevennesses in the floor or for the dishwasher to be aligned within a furniture recess and/or with the furniture frontage. In an alternative embodiment, the device may provide a fixed height without any adjustment.

As shown in FIG. 1, the domestic appliance 100 stands on or is supported by one or more feet (e.g., only one foot 1 being shown in FIG. 1) on a supporting floor, e.g., kitchen floor 3. As described in detail later, each foot 1 is formed in two parts from a basic foot body 12 and a static friction element 17. In an example embodiment, the basic foot body 12 includes a dimensionally stable, hard thermoplastic material (e.g., polypropylene) and may be produced by an injection molding process, while the static friction element 17 includes soft, rubber-like elastomer material such as TPE or elastic TPE that may be injection molded onto or otherwise formed (e.g., mechanically attached, glued, connected via hook and look fastener, etc.) with the basic foot body 12.

The basic foot body 12 includes a connecting member, e.g., a threaded shank 5, onto the lower end of which is molded a radially extending base plate or foot plate 7. The threaded shank 5 of the basic foot body 12 is, according to FIG. 1, joined by screw connection to an internal thread 9 of a fixing bracket 11 of the height adjustment device.

Figure 2:
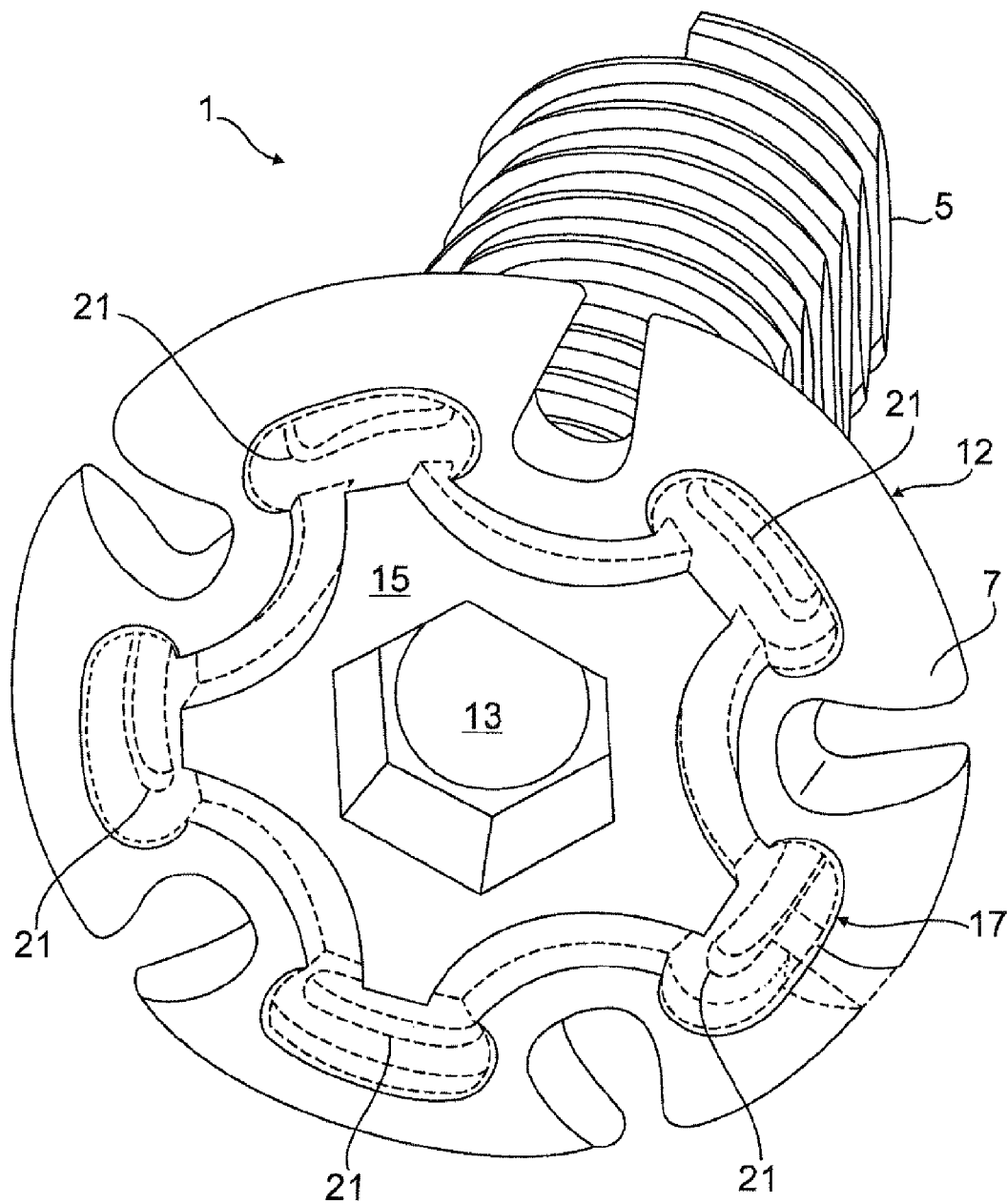
FIGS. 2 and 3 show the foot of the height adjustment device of FIG. 1 from various perspectives.
Figure 4:
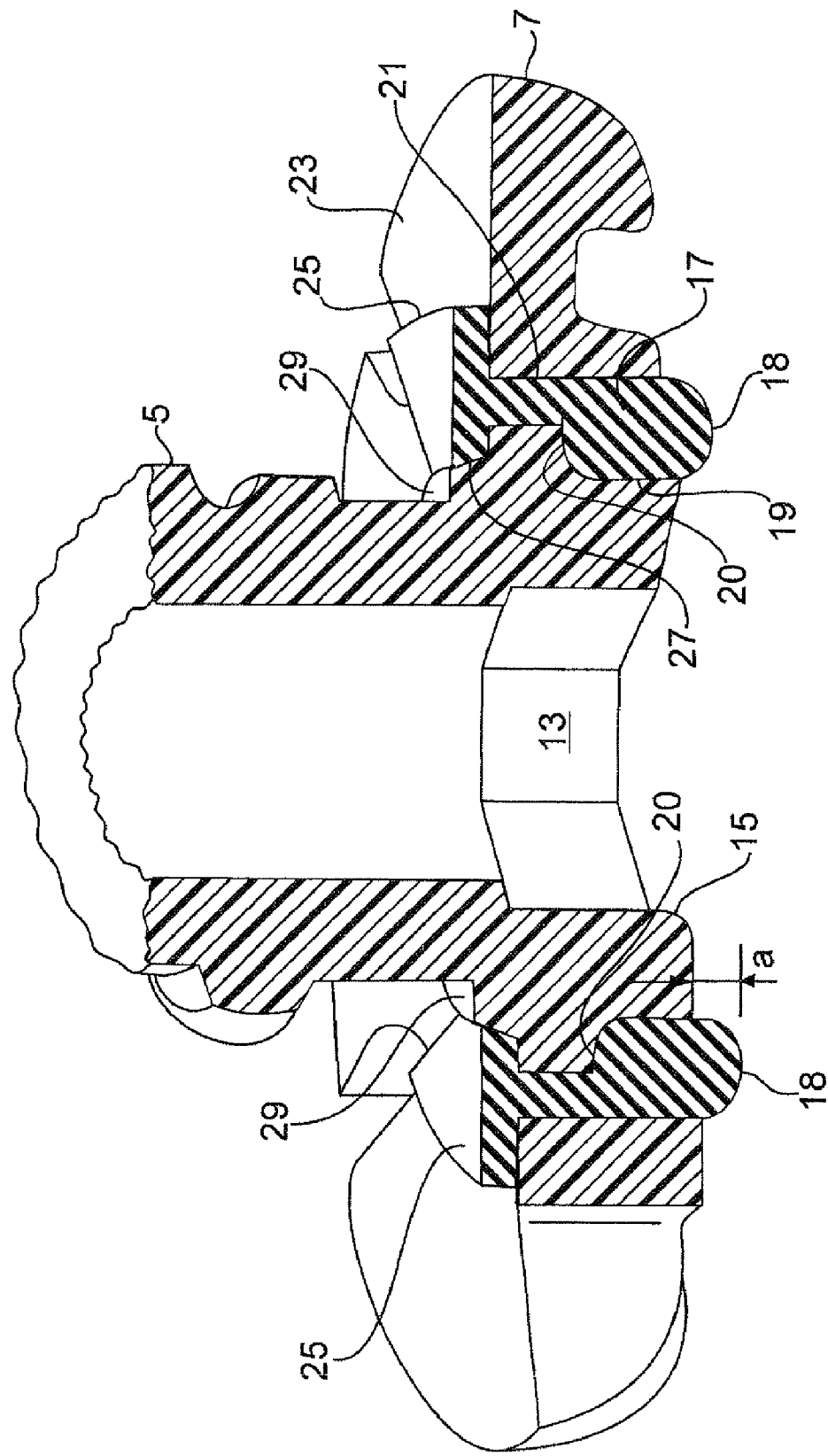
FIG. 4 shows a cross-sectional view of the foot of the height adjustment device of FIG. 1.
Figure 6:
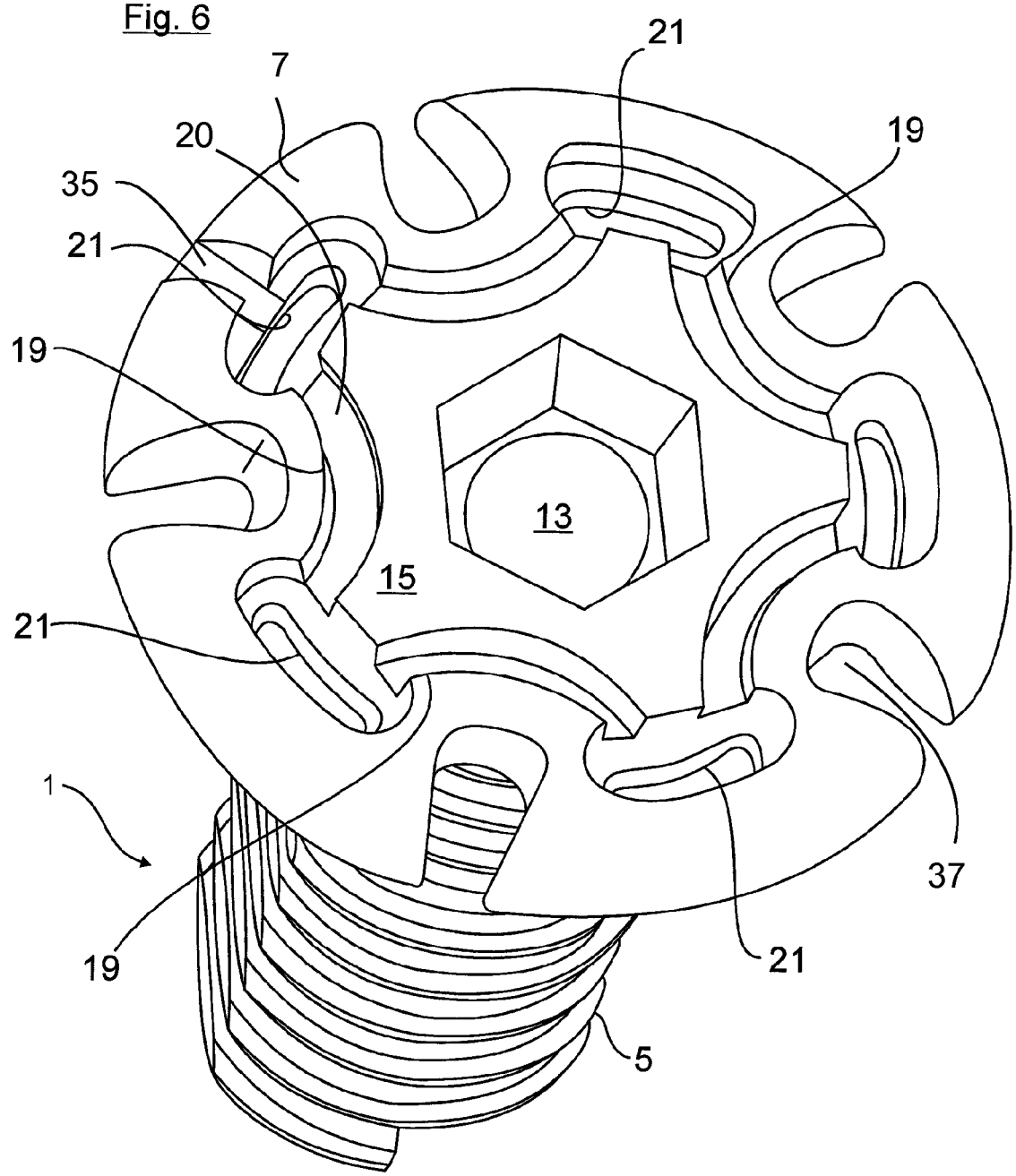

As indicated in FIG. 1 by the broken line and in FIGS. 2, 4, and 6, the base plate 7 of the basic foot body 12 includes a central recess 13 on the floor side, that functions as a tool attachment section, e.g., for a driver having a hexagonal head. To adjust the height, the domestic appliance may be tilted on its rear feet, which exposes the tool attachment section 13 of the front feet 1 for the screwdriver, therefore making them accessible for tools. The basic foot body may also include one or more elongated openings 37 (FIG. 6) along its perimeter (e.g., 1, 2, 3, or more openings, e.g., 5 even spaced openings), which may also function as a tool attachment section, e.g., for a screwdriver. Alternatively, the foot may be rotatable without the tool attachment section.

Figure 3:
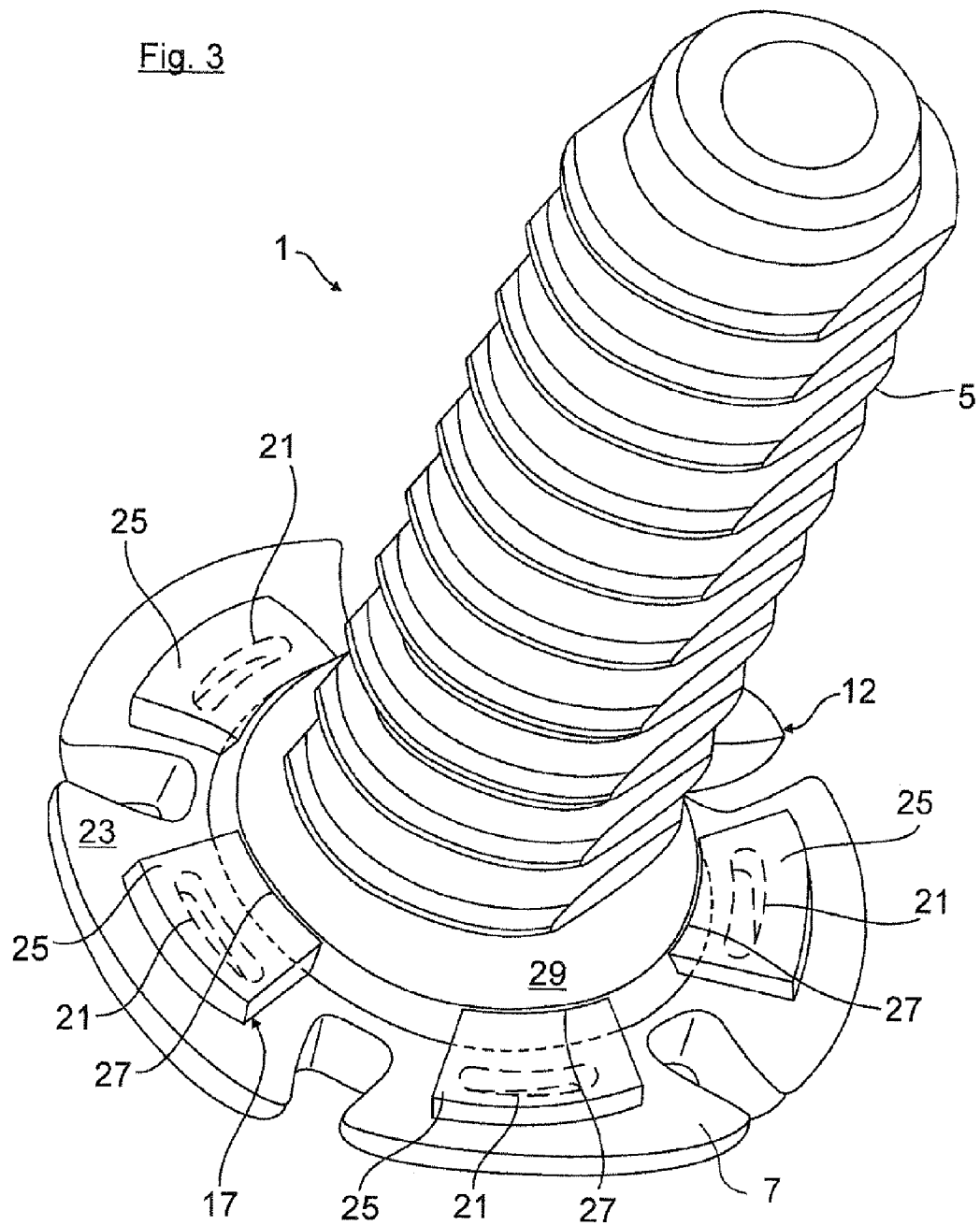

FIGS. 2 and 3 show the foot 1 of the height adjuster, in each case standing alone. As illustrated in FIG. 2, the tool attachment recess 13 is incorporated in the center of the floor side 15 of the base plate 7 and includes a polygonal profile (e.g., hexagon, pentagon, etc.). According to FIG. 2, the static friction element 17 is formed on the floor side 15 of the base plate 7, and at least partially around the tool attachment recess 13.

The static friction element 17 has a star-like shape and forms a frame-like member around the tool attachment recess 13, but may take the form of other shapes, e.g., polygon, non-polygon, round, one or more independent grooves or apertures, etc. Furthermore, the static friction element 17 is formed from a rubber-like elastomer material, thereby increasing the static friction between the foot 1 and the supporting floor 3 in use. As is apparent from FIG. 1, the static friction element 17 is located in an intermediate position between the base plate 7 of the foot 1 and the supporting floor 3. For this purpose, the static friction element 17 protrudes beyond the floor side 15 of the foot by an amount "a", as shown in FIG. 4. The amount "a" may be about 1-7 mm, e.g., 2-5 mm. The static friction element 17 therefore provides a floor contact surface 18 for the foot 1, so that the floor side 15 of the basic foot body 12 is spaced from or makes no contact with the supporting floor 3.

In an alternative embodiment, the static friction element and the base plate may be substantially co-planar, especially as the static friction element may compress under load, such that both the static friction element and the base plate provide floor contacting surfaces that are substantially flush with one another. In such embodiment, the static friction element is provided to a selected portion or area of the floor contacting surface of the foot (i.e., the entire area provided by the floor contacting surface is not covered by the static friction element), which provides a tradeoff to benefit both installation and operational uses as discussed above. In this embodiment, the static friction element is preferably symmetrical as the angle of rotation of the foot may be unknown when leveling the appliance.

Figure 10:
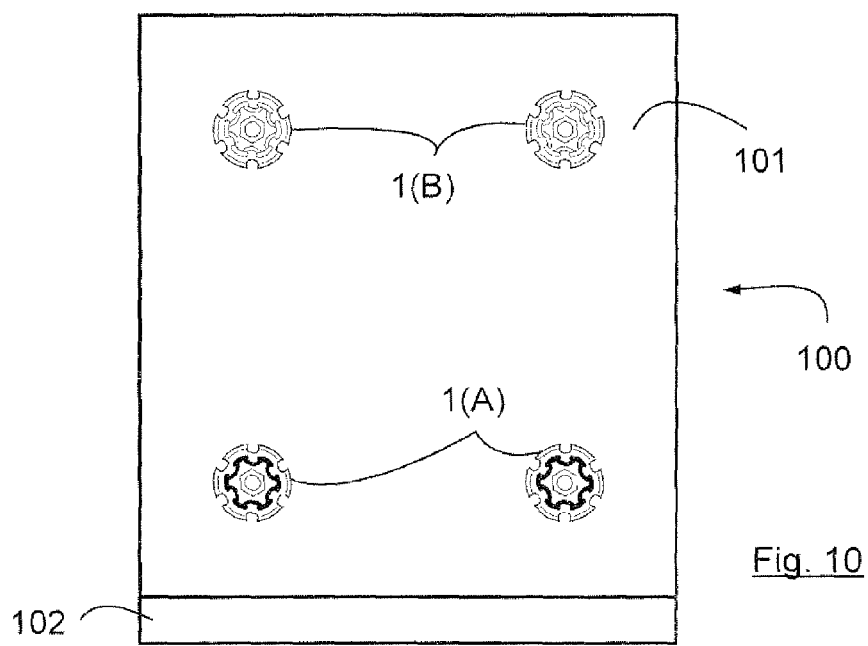
FIG. 10 is a bottom view of a domestic appliance including front and back feet according to an embodiment of the present invention.
Figure 11A:
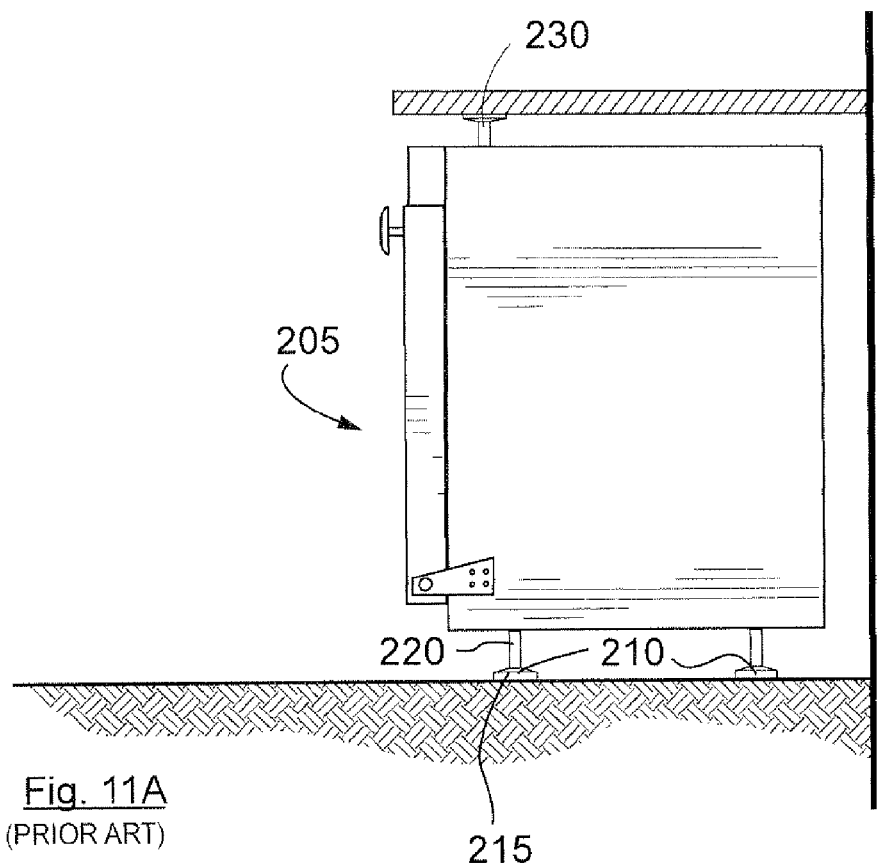
FIG. 11A shows a domestic appliance with prior art height adjustable feet.
Figure 11B:
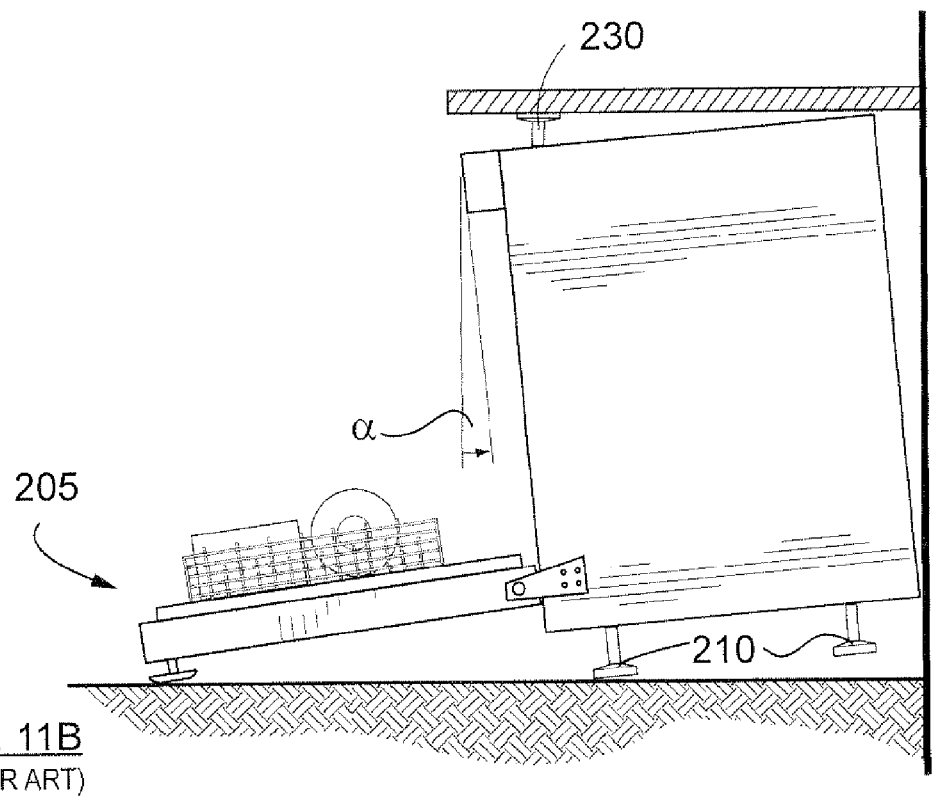
FIG. 11B shows the domestic appliance of FIG. 7A in a tilted position when heavily loaded.

FIG. 10 illustrates an exemplary embodiment of a domestic appliance 100 (e.g., dishwasher) including a washing compartment 101 and a door 102 provided to the washing compartment. As illustrated, front feet 1(A) of the domestic appliance 100 (adjacent the door 102), which may be lifted from the ground during installation, include the static friction element (indicated in black shading), while the back feet 1(B) of the domestic appliance may be substantially friction free to allow sliding. In such embodiment, the back feet 1(B) may be substantially similar to the front feet 1(A) but without the static friction element, i.e., both the front and back feet include the same basic foot body 12 which provides a sufficient support function.

As also follows from FIGS. 2 to 4, the static friction element 17 is embedded or supported in one or more grooves, e.g., a star-shaped circumferential groove 19, which extends along the floor side 15 of the base plate 7. The static friction element 17, according to FIG. 4, may protrude beyond the circumferential groove 19 by an amount "a". One or more openings 21 (e.g., 5 openings as illustrated) are provided in the base plate 7 and extend into the groove 19. As illustrated, the openings 21 are spaced apart from one another and are open towards the top 23 of the base plate 7. The star-shaped static friction element 17 is supported within the groove 19 and includes anchoring sections 25 that interlock with respective openings 21 and/or portions that surround the openings 21. As illustrated, the anchoring sections 25 of the static friction element 17 extend through respective openings up to the top 23 of the base plate 7 and the expanded, essentially rectangular shape of the anchoring sections engage or overlap the top 23 of the base plate 7. As shown in FIG. 3, the anchoring sections 25 of the static friction element 17 include internal edges 27 that are in a form-fitting arrangement with a central, tapered molded section 29 of the threaded shank 5.

Figure 5:
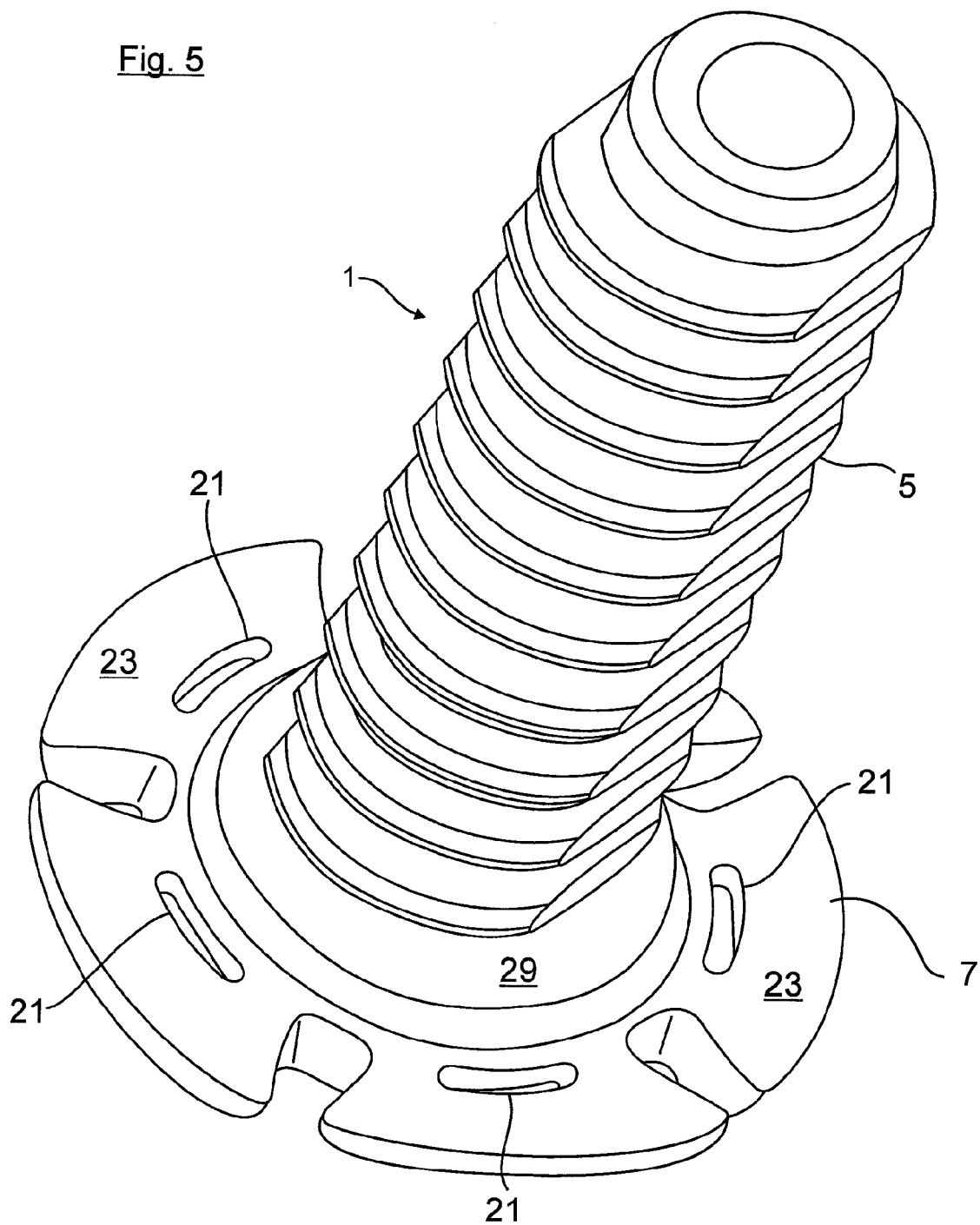
FIGS. 5 and 6 show a basic foot body of the foot of the height adjustment device of FIG. 1 from different perspectives.

The foot 1 according to an example embodiment of the invention, is produced by a two-component injection molding method. In a first process step, the basic foot body 12 is produced by an injection molding method, using a thermoplastic material, as shown in FIGS. 5 and 6. FIG. 6 shows the shape of the groove 19 in the floor side 15 of the basic foot body 12. On the radially outwardly projecting tips of the circumferential groove 19, the openings 21 can each be seen in the groove base 20. The openings 21 extend to the top 23 of the base plate 7.

In a subsequent production step, the basic foot body 12 is placed in an injection molding chamber and recast with a relatively soft elastomeric material, e.g., TPE, to form the static friction element 17. As shown in FIG. 6, a gate 35 extends from the perimeter of the base plate and into one of the openings 21, with the adjacent grooves allowing the material to flow to all of the other openings 21 and grooves 19. This allows material to flow through the gate, openings 21, and into the grooves 19 to form the static friction element during molding. However, it should be appreciated that more than one gate may be provided to facilitate molding of the static friction element within the groove.

Figure 7:
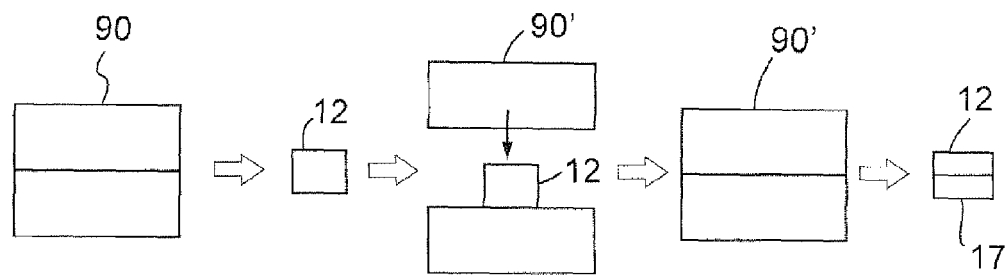
FIG. 7 is a schematic view showing an exemplary molding process according to an embodiment of the present invention.

FIG. 7 is a schematic view showing an exemplary molding process. As illustrated, the foot body 12 may be molded of a first material in a mold 90, and then the foot body 12 may be recast in another mold 90' to mold the friction element 17 of a second material onto the foot body 12.

In an alternative embodiment, the foot may be integrally formed in one-piece from the same material, such material structured to satisfy both criteria or functions of the foot body and static friction element (e.g., provide a support and attachment function as well as an enhanced friction function to the foot while allowing sliding for installation). The material may be treated in some areas to be harder/softer than other areas, e.g., by controlling temperature, timing, etc., of the molding process. In another embodiment, the standard thermoplastic foot can include texturing on the bottom surface to enhance friction.

Figure 8:
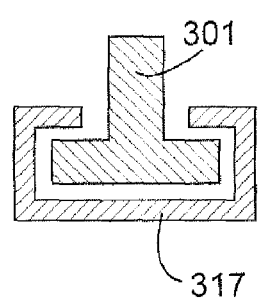
FIG. 8 shows a retrofitable static friction element according to an embodiment of the present invention.
Figure 9:
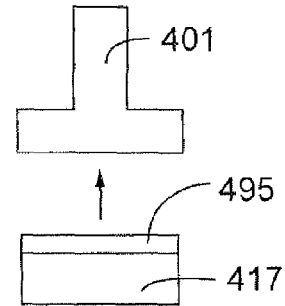
FIG. 9 shows a retrofitable static friction element according to another embodiment of the present invention.

In another alternative embodiment, the static friction element may be retrofit to an existing foot. For example, the static friction element (e.g., molded of an elastomeric material) may be formed as a separate piece and attached to the hard base of the existing foot. In one example, as shown in FIG. 8, the static friction element 317 may be in the form of a sock or cover adapted to attach or otherwise wrap around the existing foot 301. In another embodiment, as shown in FIG. 9, the static friction element 417 may be provided with an adhesive or sticky surface 495 adapted to attach the friction element to the existing foot 401. Such adhesive or sticky surface may be covered or protected by a removable laminate or tape adapted to be removed before adhering. Another alternative is to spray a friction enhancing material onto the bottom surface of the feet 301, 401, and/or onto the floor where the (front) feet are installed.

Static friction elements 317, 417 can have a circular or polygonal shape, and may be selected to match the shape of the foot. Static friction elements 317, 417 can take the form of a pattern or other shape(s) that does not completely cover the entire surface of the bottom of the feet 301, 401, in which some portion or portions of the hard base are covered with the elastomeric material and other portions are not.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A foot for supporting a domestic appliance on the floor, the foot comprising:
   a foot body constructed of a first material, the foot body including a connecting member adapted to connect to a base of the domestic appliance and a base plate; and
   a friction element constructed of a second material, the friction element provided to the base plate and including a floor contacting surface adapted to contact the floor,
   wherein the foot body is structured to provide a support and attachment function to the foot and the friction element is structured to provide a friction function to the foot to maintain positioning of the foot with respect to the floor, and the second material has a coefficient of static friction that is greater than that of the first material, and
   wherein the friction element is provided to one or more selected portions or areas of the base plate such that the friction element covers the selected portions or areas of the base plate and other portions or areas of the base plate are uncovered,
   wherein the base plate of the foot body includes a groove to receive the friction element, and
   wherein the base plate includes at least one opening that extends from a top or side surface of the base plate into the groove, and the friction element includes at least one anchoring section interlocked with the opening.

2. The foot according to claim 1, wherein the foot body is constructed of a thermoplastic material and the friction element is constructed of an elastomeric material.

3. The foot according to claim 2, wherein the foot body is constructed of a dimensionally stable, hard polypropylene material and the friction element is constructed of a soft, rubber-like elastomer material.

4. The foot according to claim 1, wherein the connecting member includes a threaded shank.

5. The foot according to claim 1, wherein the friction element protrudes beyond the foot body so as to space the foot body from the floor in use.

6. The foot according to claim 5, wherein the friction element protrudes beyond the foot body by about 1-7 mm.

7. The foot according to claim 1, wherein the foot is structured to prevent tilting of the domestic appliance without additional attachment provided to the domestic appliance.

8. A dishwasher, comprising:
   a washing compartment;
   a door provided to the washing compartment; and
   a plurality of feet provided to a base of the washing compartment to support washing compartment on the floor,
   at least one of the feet comprises the foot according to claim 1 and includes an enhanced friction portion compared to the other feet.

9. A dishwasher according to claim 8, wherein the feet includes a pair of front feet and a pair of back feet.

10. A dishwasher according to claim 9, wherein one or both of the front feet include the foot including the enhanced friction portion.

11. A dishwasher according to claim 9, wherein the rear feet do not include the foot including the enhanced friction portion.

12. Domestic appliance comprising an appliance base and at least one foot provided to the appliance base to support the appliance in an operative position, said foot comprising:
- a foot body constructed of a first material, the foot body including a connecting member adapted to connect to the base of the domestic appliance and a base plate; and
- a friction element constructed of a second material, the friction element provided to the base plate and including a floor contacting surface adapted to contact the floor,
- wherein the foot body is structured to provide a support and attachment function to the foot and the friction element is structured to provide a friction function to the foot to maintain positioning of the foot with respect to the floor, and the second material has a coefficient of static friction that is greater than that of the first material, and
- wherein the friction element is provided to one or more selected portions or areas of the base plate such that the friction element covers the selected portions or areas of the base plate and other portions or areas of the base plate are uncovered,
- wherein the base plate and the friction element are at least positively connected, and
- wherein the base plate has at least one opening through which the friction element extends to the top of the base plate facing away from a floor-side of the friction element.

13. Domestic appliance according to claim 12, wherein the foot is height adjustable.

14. Domestic appliance according to claim 12, wherein the foot includes sections with different coefficients of friction.

15. Domestic appliance according to claim 12, wherein a section of the foot includes the floor-side that provides the floor contacting surface.

16. Domestic appliance according to claim 15, wherein the foot comprises the foot body that provides structure, and which is made from the first material, which is more dimensionally stable and/or harder than the second material.

17. Domestic appliance according to claim 15, wherein the section includes a coefficient of static friction that is greater than other sections of the foot.

18. Domestic appliance according to 17, wherein the other sections of the foot are made from the first material and the section including the floor-side is made from the second material.

19. Domestic appliance according to claim 18, wherein the second material is an elastomer.

20. Domestic appliance according to claim 18, wherein the second material is applied to the first material by a plastic injection molding method.

21. Domestic appliance according to claim 12, wherein the foot body has on the floor side, a recess in which is inserted the friction element.

22. Domestic appliance according to claim 21, wherein the recess is formed as a circumferential groove.

23. Domestic appliance according to claim 21, wherein the recess is designed point-symmetrically, in a star or annular shape.

24. Domestic appliance according to claim 21, wherein the opening is located in a base of the recess.

25. Domestic appliance according to claim 21, wherein the friction element protrudes from the floor side by an amount from the recess.

26. Domestic appliance according to claim 12, wherein the friction element comprises one or more anchoring sections, each of which partially engages with the top of the base plate.

27. Domestic appliance according to claim 26, wherein the top of the base plate includes at least one molded section, which engages with each anchoring section of the friction element.

28. Domestic appliance according to claim 27, wherein the base plate includes a threaded shank, which forms at least a section of the molded section.

29. Domestic appliance according to claim 12, wherein the domestic appliance is a dishwasher.

30. Domestic appliance according to claim 12, wherein the domestic appliance is a washing machine.

31. A foot for an appliance, comprising:
- a base portion made of a first material, the base portion having a connecting member adapted to connect to a base of the appliance and a base plate including a bottom surface to contact the floor in use; and
- at least one groove or recess formed in the bottom surface to receive a second material having enhanced friction compared to the first material, the base portion further comprising a top surface, opposite the bottom surface, structured and dimensioned to form one or more anchoring sections to receive the second material, the top and bottom surfaces communicating via the groove or recess.

32. A foot according to claim 31, further comprising the second material.

33. A foot according to claim 32, wherein the foot is structured to operate in a first mode in which the bottom surface of the first material contacts the floor in use without the second material being in the groove or recess, and a second mode in which the second material is included in the at least one groove such that it contacts the floor in use.

34. A foot for an appliance, comprising:
- a base portion made of a first material, the base portion having a connecting member adapted to connect to a base of the appliance and a base plate including a bottom surface to contact the floor in use; and
- at least one groove or recess formed in the bottom surface to optionally receive a second material having enhanced friction compared to the first material, such that the foot is operable in a first mode in which the bottom surface of the first material contacts the floor in use without the second material being in the groove or recess, and a second mode in which the second material is anchored in the at least one groove via an anchor provided to or on a top surface of the base portion such that it contacts the floor.

35. A foot according to claim 34, further comprising the second material.

* * * * *